(12) United States Patent
Song et al.

(10) Patent No.: US 7,253,846 B2
(45) Date of Patent: Aug. 7, 2007

(54) LIQUID CRYSTAL DISPLAY HAVING TOUCH PANEL WITH INCREASED INPUT AREA AND FABRICATING METHOD THEREOF

(75) Inventors: In Duk Song, Kumi-shi (KR); Yong Ik Bang, Taegu-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/143,900

(22) Filed: May 14, 2002

(65) Prior Publication Data
US 2003/0067580 A1  Apr. 10, 2003

(30) Foreign Application Priority Data
Oct. 10, 2001  (KR) ............................... 2001-62421

(51) Int. Cl.
*G02F 1/1335* (2006.01)
(52) U.S. Cl. .................... 349/12; 345/173; 349/150
(58) Field of Classification Search ................. 349/12, 349/149–152; 345/173
See application file for complete search history.

(56) References Cited

U.S. PATENT DOCUMENTS

| | | | | |
|---|---|---|---|---|
| 4,723,836 A | * | 2/1988 | Kono et al. | 349/12 |
| 6,016,134 A | * | 1/2000 | Ota | 345/104 |
| 6,590,622 B1 | * | 7/2003 | Nakanishi et al. | 349/12 |
| 6,720,952 B1 | * | 4/2004 | Takizawa et al. | 345/173 |
| 2001/0020985 A1 | * | 9/2001 | Hinata | 349/12 |
| 2001/0022632 A1 | * | 9/2001 | Umemoto et al. | 349/12 |
| 2001/0043291 A1 | * | 11/2001 | Kono et al. | 349/12 |
| 2002/0054261 A1 | * | 5/2002 | Sekiguchi | 349/122 |

FOREIGN PATENT DOCUMENTS

| | | |
|---|---|---|
| JP | H07-114010 | 5/1995 |
| KR | 2000-63072 | 10/2000 |

* cited by examiner

*Primary Examiner*—David Nelms
*Assistant Examiner*—Phu Vu
(74) *Attorney, Agent, or Firm*—McKenna Long & Aldridge LLP

(57) ABSTRACT

This invention relates to liquid crystal display with a touch panel that does not overlap with a display area of liquid crystal panel but is still capable of obtaining a non-touch area.

23 Claims, 8 Drawing Sheets

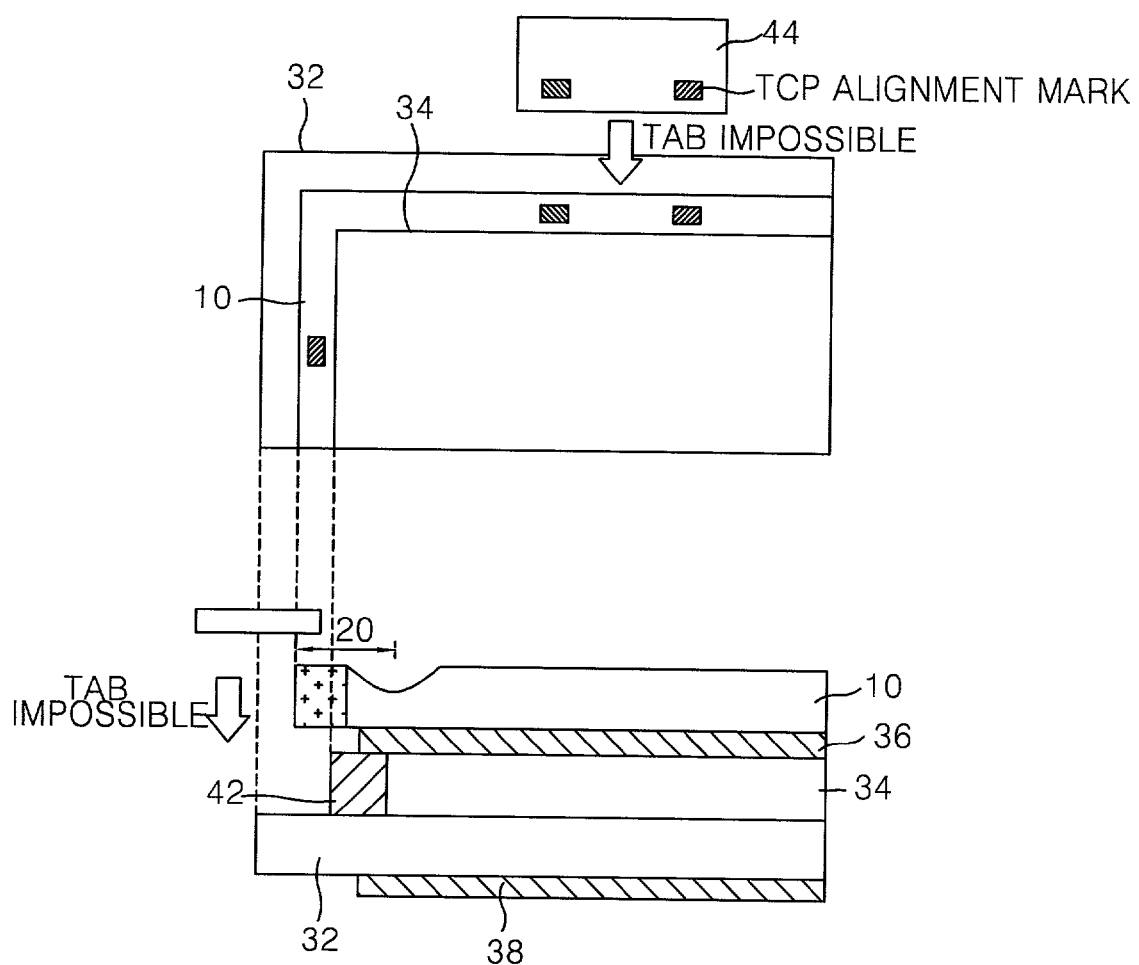

US 7,253,846 B2

LIQUID CRYSTAL DISPLAY HAVING TOUCH PANEL WITH INCREASED INPUT AREA AND FABRICATING METHOD THEREOF

This application claims the benefit of Korean Patent Application No. P-2001-62421, filed on Oct. 10, 2001, which is hereby incorporated by reference for all purposes as if fully set forth herein.

BACKGROUND OF THE INVENTION

1. Field of the Invention

The present invention relates to a touch panel liquid crystal display, and more particularly to a liquid crystal display with a touch panel that does not overlap with a display area of a liquid crystal panel but is still capable of obtaining a non-touch area.

2. Description of the Related Art

A touch panel device reads an input operation of a user by a coordinate value and inputs data. Touch panels are deposited on a display device, e.g., a liquid crystal display (LCD) and are often used, for example, in bank automatic teller machines (ATMs). Touch panels generate a voltage or electric current signal corresponding to the position where it is pressed with a stylus pen or finger and thereby input graphic or other data assigned by the user. Recently, analogue input type resistance film system touch panels have been integrated with liquid crystal panels of flat panel display devices.

An active matrix liquid crystal display having a touch panel deposited thereon displays a picture corresponding to a video signal, similar to a television signal, on a picture element pixel matrix where pixels are arranged at crossings of gate and data lines. Each pixel includes a liquid crystal cell that controls the amount of light transmitted in accordance with a data signal voltage level from the data line. A thin film transistor (TFT) is provided at crossings of the gate and data lines, responds to scanning signals (gate pulse) from the gate line, and switches data signals such that they are transferred to a liquid crystal cell.

A liquid crystal display requires a plurality of driving integrated circuits (D-ICs) that are connected to both the data and gate lines to supply data signals and scanning signals to the data lines and the gate lines, respectively. D-ICs are conventionally provided between a printed circuit board (PCB) and a liquid crystal panel, are responsive to control signals supplied from the PCB, and supply data scanning signals to the data and gate lines of the liquid crystal panel. In the Tape Automated Bonding (TAB) method, a method commonly used to mount D-ICs, the display area of the panel can be made large and the mounting process is simple.

Referring to FIG. 1, a liquid crystal display with a conventional touch panel includes a liquid crystal panel 40 and a touch panel 10 on the liquid crystal panel 40.

The liquid crystal panel 40 includes a lower substrate 32 where a thin film transistor (TFT) array (not shown) and an alignment film (not shown) are sequentially formed; an upper substrate 34 where a color filter array (not shown), a common electrode (not shown), and an alignment film (not shown) are sequentially formed; liquid crystal (not shown) injected into a gap formed by a spacer and a sealant (not shown) between the upper substrate 34 and the lower substrate 32; an upper polarizing plate 36 adhered to the upper surface of the upper substrate 34; and a lower polarizing plate 38 adhered to the lower surface of the lower substrate 32. A black matrix 42 is formed is formed in a non-display area that is at the outer edge of the upper substrate 34. The black matrix 42 prevents visible light from radiating to the outside.

A drive circuit portion for driving such a liquid crystal panel 40 includes a PCB 46, a tape carrier package (TCP) 44 connecting the liquid crystal panel 40 and the PCB 46, and a D-IC 48 mounted on the TCP 44. The TCP 44 is adhered to the lower substrate 32 by an anisotropic conductive film (ACF). The D-IC 48 mounted on the TCP 44 supplies a driving signal in accordance with a control signal from the PCB 46 to the liquid crystal panel 40. The touch panel 10 provides the location of information for a user to select the information displayed on a screen, and displays the information on a display area of the liquid crystal panel 40.

With reference to FIG. 2, principles of operation of the touch panel 10 are explained. Electrodes 50A and 50B aligned in the X direction and electrodes 52A and 52B in the Y direction of the touch panel 10 are connected to an output portion 54.

Voltage is alternately applied to the electrodes 50A and 50B in the X direction and electrodes 52A and 52B in the Y direction to detect the location X and Y of a contact point created by a user. When voltage is applied to the X direction electrodes 50A and 50B, voltage is not applied to the Y direction electrodes 52A and 52B. A fixed amount of voltage that is applied to the upper X direction electrode 50A and the lower X direction electrode 50B is grounded. Thus, an equipotential is applied to the touch panel 10 in the X direction. Herein, the electric current corresponding to the voltage of the contact point contacted by the user flows to the Y direction electrodes 52A and 52B to output the Y coordinate of the contact point to the output portion 54.

In the same way, when voltage is applied to the Y direction electrodes 52A and 52B, voltage is applied to the X direction electrodes 50A and 50B. At this moment, a fixed amount of voltage is not applied to any one of the Y direction electrodes 52A and 52B and another electrode is grounded. Thus, an equipotential is applied to the touch panel 10 in the Y direction. Electric current corresponding to the voltage of the contact point contacted by the user flows to the X direction electrodes 50A and 50B to output the X coordinate of the contact point to the output portion 54.

Likewise, the touch panel 10 detects location information inputted from the outside by detecting the X and Y coordinates of the contact point.

FIGS. 3A to 3D illustrate a method of fabricating a liquid crystal display having a touch panel.

Referring to FIG. 3A, spacers (not shown) are dispersed between the lower substrate 32 including the TFT array and the upper substrate 34 where the color filter array is formed. Subsequently, the upper substrate 34 and the lower substrate 32 are aligned and joined together. The black matrix 42 is formed for preventing light leakage in the non-display area of the upper substrate 34. Liquid crystal (not shown) is injected into a gap provided by the spacer between the upper substrate 34 and the lower substrate 32.

Subsequently, the lower polarizing plate 38 is adhered to the lower surface of the lower substrate 32, as illustrated in FIG. 3B. Subsequently, as shown in FIG. 3C, the upper polarizing plate 36 is adhered to the upper surface of the previously provided upper substrate 34 and the touch panel 10 is adhered to the upper surface of the polarizing plate.

Then, as shown in FIG. 3D, the TCP 44 connects a PCB and a pad portion of the lower substrate 32. The ACF is prepressed and fixed on the pad portion of the lower substrate 32. The TCP is punched 44 to provide holes for transporting and for an integrated circuit. After punching the TCP 44, an alignment mark of the TCP 44 and an alignment mark of the lower substrate 32 are aligned and then the TCP 44 is pressed to be fixed on the ACF. The resin of the ACF is hardened after the prefixed TCP 44 is heat-treated and pressed. Conductive balls in the inside of the ACF electrically connect the TCP 44 and the pad portion of the lower substrate 32.

A flow chart of such a process procedure is illustrated in FIG. 4. As shown in FIG. 4, after joining the upper substrate and the lower substrate together (S41), the lower polarizing plate is adhered to the lower surface of the lower substrate (S42). After that, the touch panel to which the upper polarizing plate is adhered is mounted on the upper surface of the upper substrate (S43). And then, the pad portion of the lower substrate is joined to the TCP in a TAB process (S44). By this method, a liquid crystal display having a touch panel is fabricated.

In such a liquid crystal display, a non-touch area 20 exists in the touch panel 10 as shown in FIG. 5A. The non-touch area 20 is composed of an adhesion area 20A for adhering an upper film of the touch panel to a lower film, and an outer area 20B to which it is impossible to input user information when the user presses the touch panel 10. Because the touch panel 10 is provided on the liquid crystal panel 40, the information of the display area is not operable in the area corresponding to the non-touch area 20 of the touch panel 10. Accordingly, the area where the liquid crystal panel 40 can be controlled is decreased due to the presence of unused area 40A in the liquid crystal panel 40.

Furthermore, when the non-touch area 20 of the touch panel 10 is provided to not overlap with the display area of the upper substrate 34 as illustrated in FIG. 5B, the non-touch area 20 of the touch panel 10 projects from the side of the upper substrate 34. Accordingly, the touch panel 10 covers the alignment mark arranged on the lower substrate 32 and occupies the position where the TCP 44 is to be formed. As a result, it becomes difficult to adhere to the TCP 44 to the pad portion of the lower substrate 32.

SUMMARY OF INVENTION

Accordingly, the present invention is directed to a liquid crystal display with a touch panel and fabricating method thereof that substantially obviates one or more of the problems due to limitations and disadvantages of the related art.

An advantage of the present invention is to provide a liquid crystal display with a touch panel that does not overlap with a display area of a liquid crystal panel but is still capable of obtaining a non-touch area.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages of the invention, a method of fabricating a liquid crystal display according to one aspect of the present invention includes the steps of joining an upper substrate to a lower substrate of a liquid crystal panel; adhering a tape carrier package, on which a driving circuit is mounted, to one side of the lower substrate; and mounting a touch panel on the upper substrate, wherein at least one edge of the touch panel extends further than at least one edge of the upper substrate.

In the method, the touch panel has a non-touch area at the edge.

In the method, the non-touch area extends further than at least one edge of the upper substrate.

In the method, the upper substrate has a non-display area at the edge.

In the method, the non-touch area extends further than at least one edge of the non-display area.

In another aspect of the present invention a crystal display includes a liquid crystal panel where an upper substrate and a lower substrate are joined together; a tape carrier package adhered to one side of the lower substrate and having a driving circuit mounted on it; and a touch panel mounted on the upper substrate, wherein at least one edge of the touch panel extends further than at least one edge of the upper substrate.

In the liquid crystal display, the touch panel has a non-touch area at the edge.

In the liquid crystal display, the non-touch area extends further than at least one edge of the upper substrate.

In the liquid crystal display, the upper substrate has a non-display area at the edge.

In the liquid crystal display, the non-touch area extends further than at least one edge of the non-display area.

In another aspect of the present invention a liquid crystal display include s a lower substrate having a lower polarizing plate adhered thereto; an upper substrate having an upper polarizing plate adhered thereto; a black matrix formed at a non-display area that is an outer edge of the upper substrate; a tape carrier package connecting the lower substrate to a printed circuit board; and a touch panel mounted on the upper polarizing plate, wherein at least one edge of the touch panel extends further than at least one edge of the upper substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 5A and 5B is a drawing that shows a problem of the liquid crystal display with the touch panel shown in FIG. 1;

DETAILED DESCRIPTION OF THE EMBODIMENT

Reference will now be made in detail to an embodiment of the present invention example of which is illustrated in the accompanying drawings.

Figure 1:
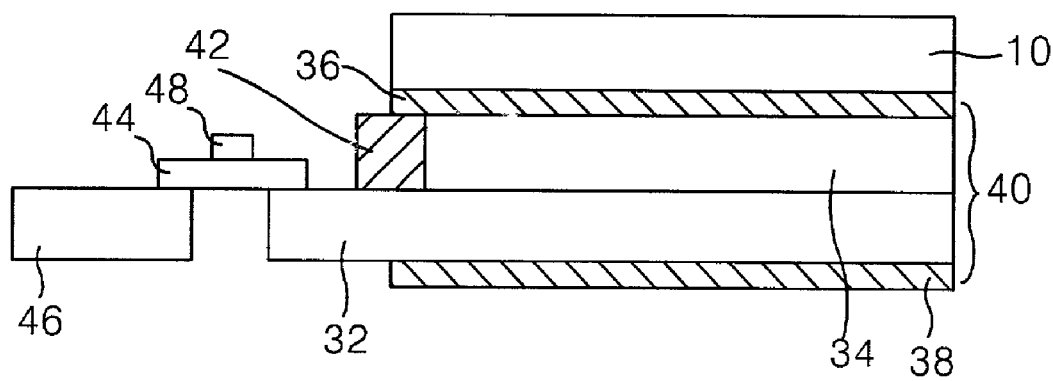
FIG. 1 is a sectional view representing a liquid crystal display with a touch panel according to a related art.
Figure 2:
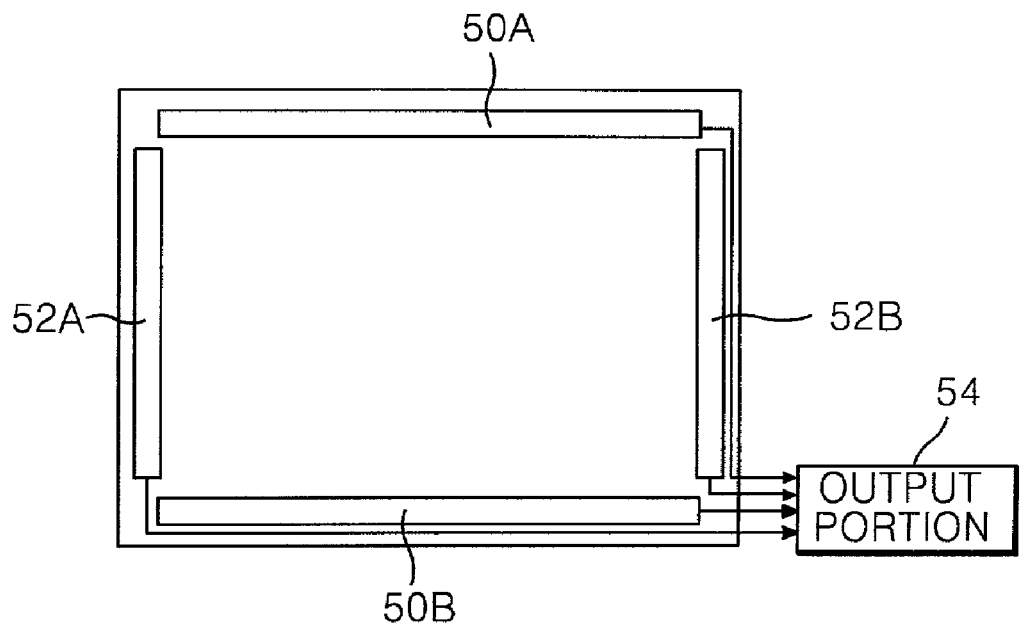
FIG. 2 represents an operation principle of the touch panel shown in FIG. 1.
Figure 3A:
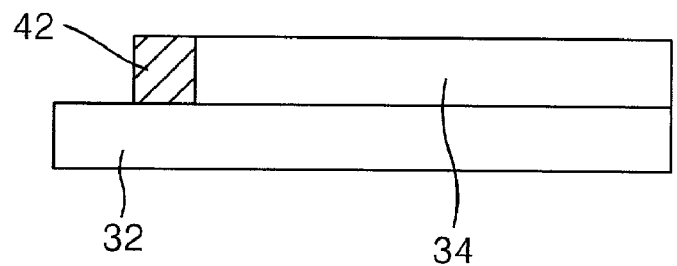
FIGS. 3A to 3D are sectional views representing a fabricating method of the liquid crystal panel with the touch panel shown in FIG. 1.
Figure 3B:
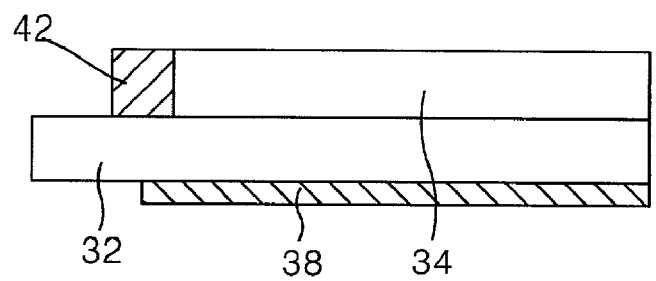
Figure 3C:
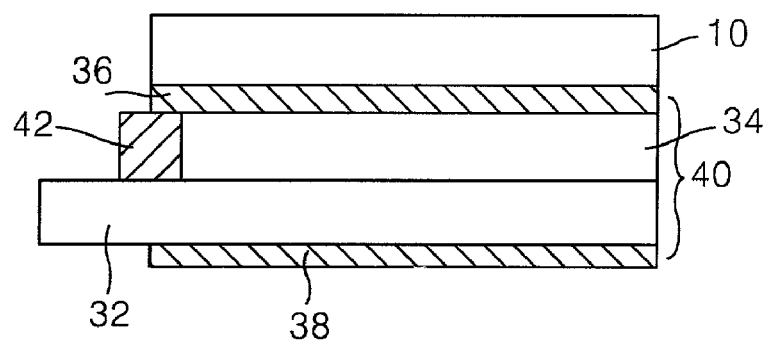
Figure 3D:
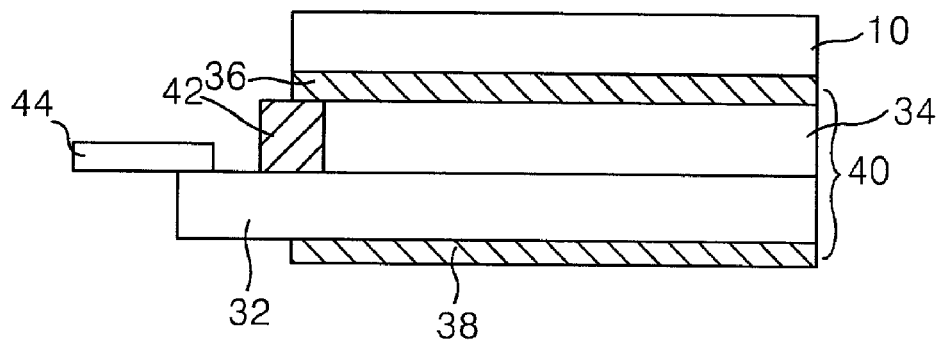
Figure 4:
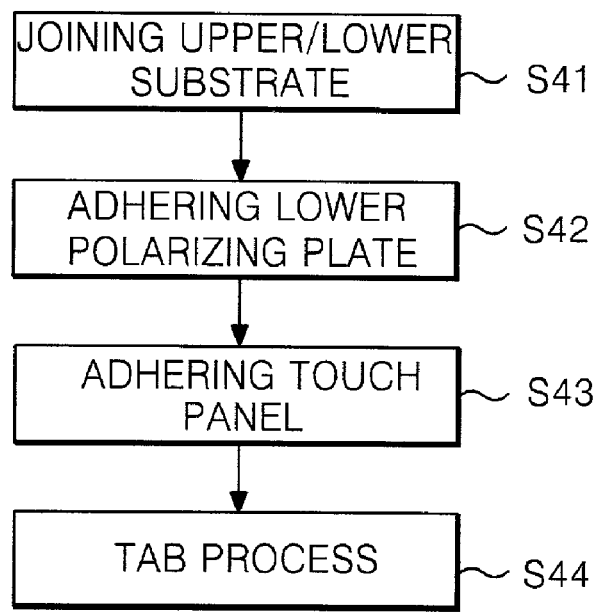
FIG. 4 is a flow chart representing the fabricating method of the liquid crystal display shown in FIG. 3.
Figure 5A:
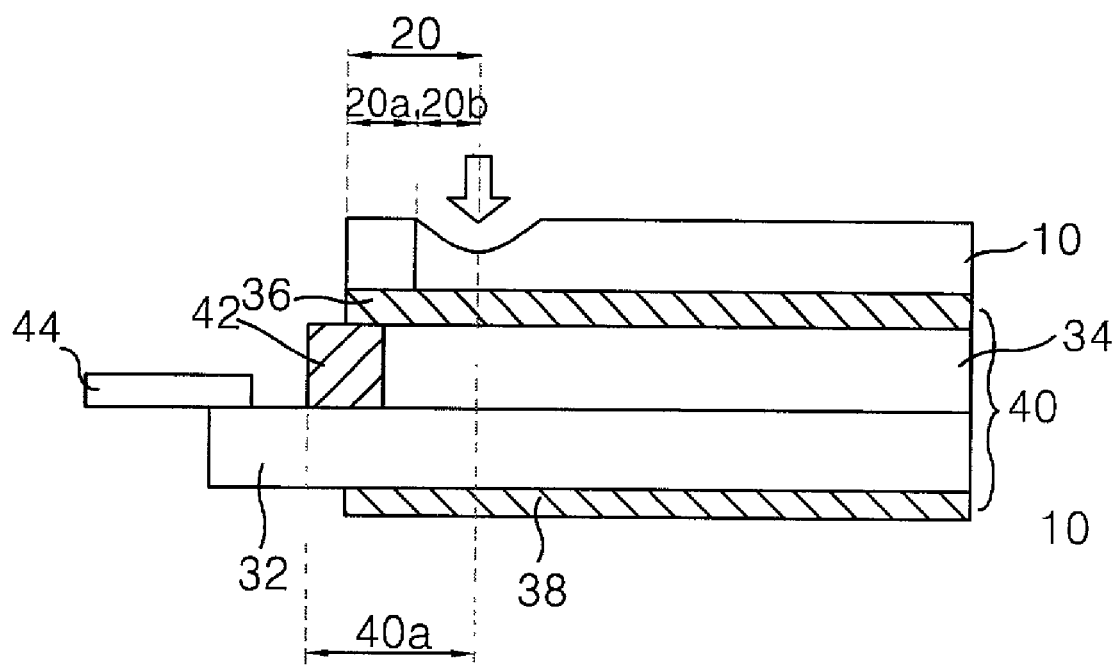
Figure 6:
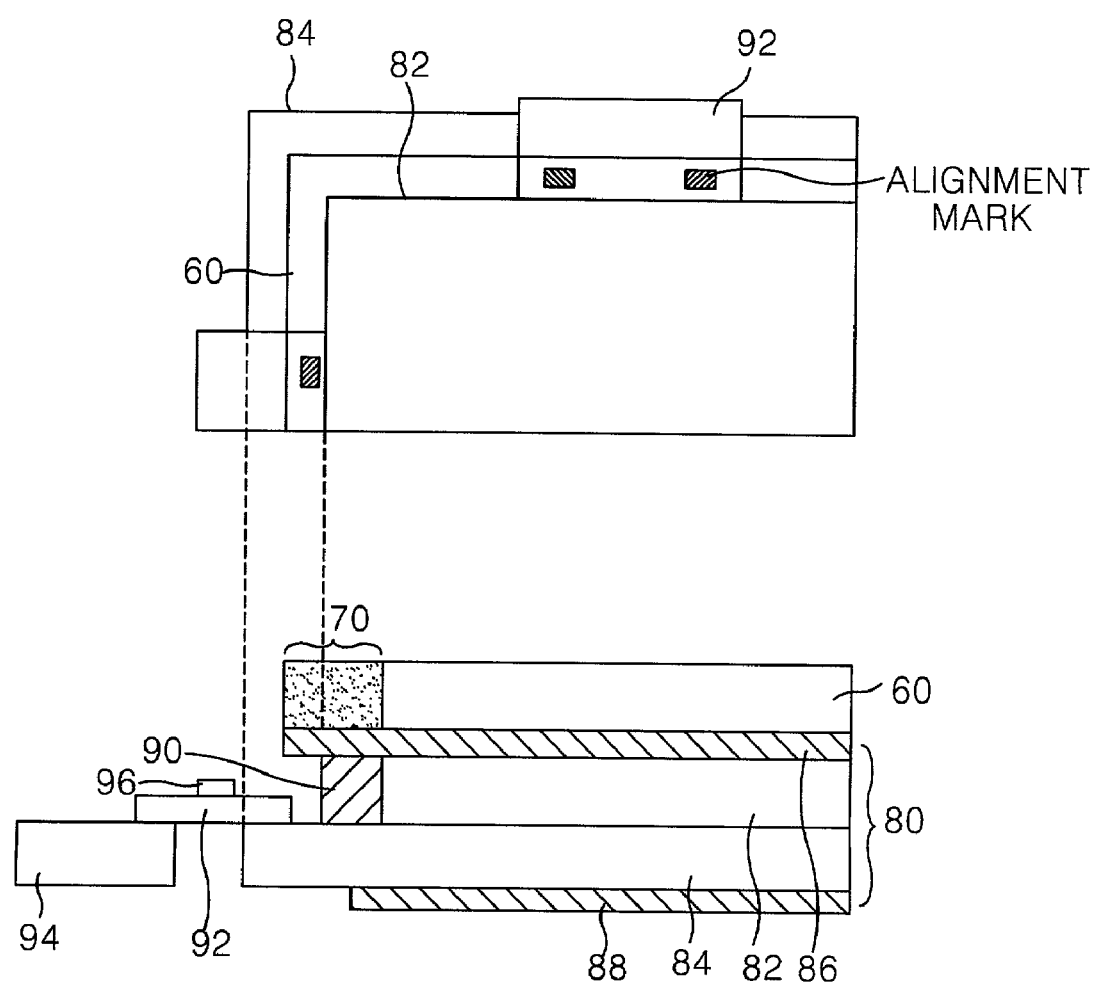
FIG. 6 represents a liquid crystal display with a touch panel according to an embodiment of the present invention.

Referring to FIG. 6, in a liquid crystal display with a touch panel according to the present invention a TCP 92 is adhered to a pad portion of a lower substrate 84 and a touch panel 60 is mounted on a liquid crystal panel 80.

The liquid crystal panel 80 includes the lower substrate 84 where a pixel electrode including a thin film transistor (TFT) array (not shown) and an aligned alignment film (not shown) are sequentially formed; an upper substrate 82 where a color filter array (not shown), a common electrode (not shown) and an alignment film (not shown) are sequentially formed; liquid crystal (not shown) injected into a gap formed by a spacer (not shown) and a sealant (not shown) between the upper substrate 82 and the lower substrate 84; an upper polarizing plate 86 adhered to the upper surface of the upper substrate 82 and a lower polarizing plate 88 adhered to the lower surface of the lower substrate 84. A black matrix 90 is formed at a non-display area that is the outer edge of the upper substrate 82. The black matrix 90 prevents visible light from radiating to the outside of the liquid crystal panel 80.

A drive circuit portion for driving such a liquid crystal panel 80 includes a PCB 94, a tape carrier package (TCP) 92 connecting the liquid crystal panel 80 and the PCB 94, and a driver integrated circuit (D-IC) 96 mounted on the TCP 92. The D-IC 96 mounted on the TCP 92 supplies a driving signal in accordance with a control signal from the PCB 94 to the liquid crystal panel 80. The TCP 92 is adhered to the lower substrate 84 by an anisotropic conducive film (ACF) and then a touch panel 60 is mounted on the liquid crystal panel 80.

The touch panel 60 provides the location of information for a user to select the information displayed on a screen, and displays the information on a display area of the liquid crystal panel 80. The touch panel 60 has a non-touch area 70 where picture information cannot be controlled. The non-touch area 70 is composed of an adhesion area for adhering an upper film to a lower film (not shown), and an outer area to which it is impossible to input user information when the user presses the touch panel 60. With reference to FIGS. 7A to 7D, a fabricating method of the liquid crystal display with the touch panel 60 is explained. The non-touch area 70 of the touch panel 60 does not overlap with the display area of the liquid crystal panel 80.

Figure 7A:
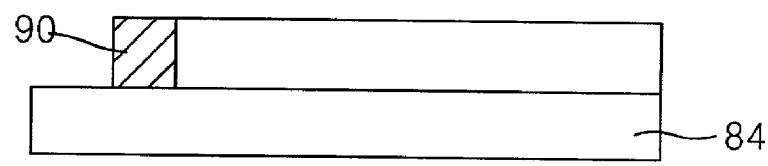
FIGS. 7A to 7D are sectional views representing a fabricating method of the liquid crystal display with the touch panel shown in FIG. 6.

Referring to FIG. 7A, spacers (not shown) are dispersed between the lower substrate 84 including the TFT array and the upper substrate 82 where the color filter array is formed, and then the upper substrate 82 and the lower substrate 84 are aligned and joined together. Herein, the black matrix 90 is formed for shutting off light in the non-display area of the upper substrate 82. Liquid crystal (not shown) is injected into the inside provided by the spacer between the upper substrate 82 and the lower substrate 84.

Figure 7B:
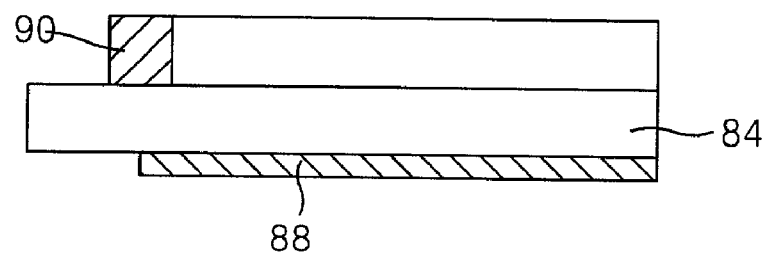

Subsequently, the lower polarizing plate 88 is adhered to the rear surface of the lower substrate 84, as illustrated in FIG. 7B.

Figure 7C:
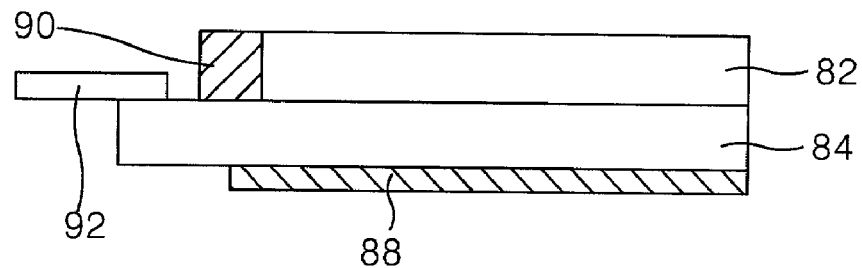

Then, a module process takes place for supplying the driving signal to the liquid crystal panel 80 to drive the liquid crystal. The TCP 92, as shown in FIG. 7C, connects the PCB and the pad portion of the lower substrate 84. The ACF is prepressed and fixed on the pad portion of the lower substrate 84. The TCP is punched 92 to provide holes for transporting and for an integrated circuit. After punching the TCP 92, the alignment mark of the TCP 92 and the alignment mark of the lower substrate 84 are made to coincide with each other and then the TCP 92 is pressed to be fixed on the ACF. The resin of the ACF is hardened after the prefixed TCP 92 is heat-treated and pressed. Conductive balls in the inside of the ACF electrically connect the TCP 92 and the pad portion of the lower substrate 84.

Figure 7D:
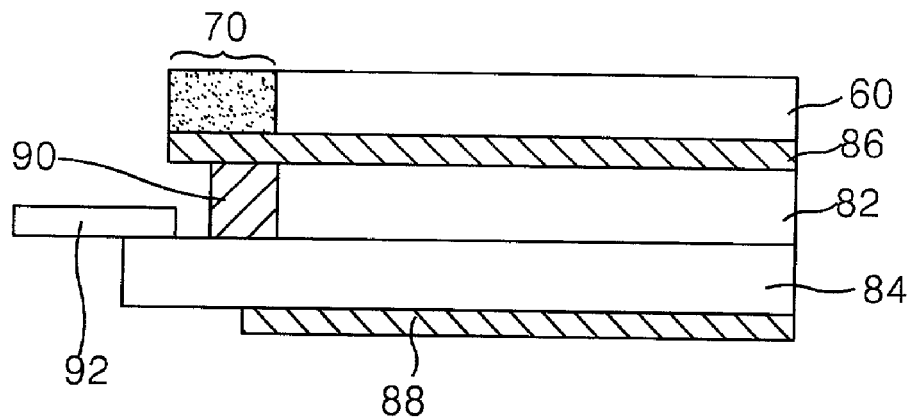

The touch panel 60 is adhered to the rear surface of the upper polarizing plate 84, as FIG. 7D, and the touch panel 60 is mounted on the upper substrate 82 of the liquid crystal panel 80.

Figure 8:
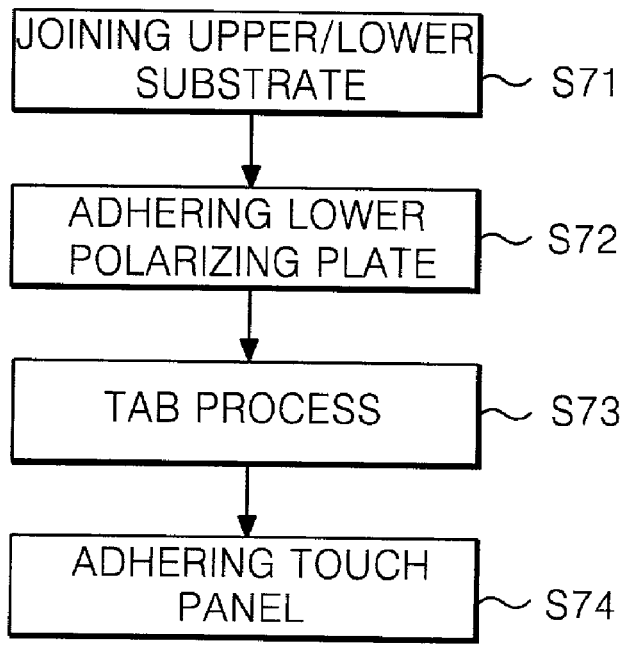
FIG. 8 is a flow chart representing the fabricating method of the liquid crystal display shown in FIG. 7.

A flow chart of such a process procedure is shown in FIG. 8. As shown in FIG. 8, after joining the upper substrate and the lower substrate together (S71), the lower polarizing plate is adhered to the rear surface of the lower substrate (S72). After that, in a Tape Automated Bonding (TAB) process, the lower substrate is joined to the TCP on which a driving circuit is mounted (S73). Then the touch panel to which the upper polarizing plate is adhered is mounted on the upper substrate (S74). This completes the liquid crystal display with the touch panel.

In this way, in the liquid crystal display with the touch panel according to the present invention the TCP 92 is adhered to the lower substrate 84 and the touch panel 60 is mounted on the liquid crystal panel 80. Accordingly, the touch panel 60 can be mounted for the non-touch area 70 of the touch panel 60 not to overlap with the display area of the liquid crystal panel 80. At this moment, the non-touch area 70 of the touch panel 60 extends further than at least one edge of the lower substrate 84.

As described above, the liquid crystal display with the touch panel and a fabricating method thereof according to the present invention adheres the TCP to the lower substrate of the liquid crystal panel and then mounts the touch panel on the liquid crystal panel, thereby having the non-touch panel area not overlap with the display area of the liquid crystal panel. Furthermore, because the liquid crystal display with the touch panel and a fabricating method thereof according to the present invention can obtain the non-touch area by only changing the order of the process, the process can be made without any addition of a new process and equipment. Accordingly, the productivity is improved and it can be applicable to all the existing liquid crystal displays without any significant modification on its design.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display with a touch panel, comprising:
joining an upper substrate to a lower substrate of a liquid crystal panel, the lower substrate having an alignment mark;
adhering a tape carrier package using the alignment mark, on which a driving circuit is mounted, to one side of the lower substrate; and
mounting a touch panel on the upper substrate after adhering the tape carrier package to the lower substrate, wherein at least one edge of the touch panel extends further than at least one edge of the upper substrate such that the edge of the touch panel covers the alignment mark in a plan view.

2. The method according to claim 1, wherein the touch panel has a non-touch area at an edge.

3. The method according to claim 2, wherein the non-touch area extends further than at least one edge of the upper substrate.

4. The method according to claim 2, wherein the upper substrate has a non-display area at an edge.

5. The method according to claim 4, wherein the non-touch area extends further than at least one edge of the non-display area.

6. The method according to claim 4, wherein the non-touch area extends further than at least one edge of the non-display area.

7. The method according to claim 1, wherein the tape carrier package is connected to a printed circuit board.

8. A liquid crystal display, comprising:
a liquid crystal panel having an upper substrate and a lower substrate joined together, the lower substrate having an alignment mark for adhering a tape carrier package to the liquid crystal panel;
a tape carrier package joined to one side of the lower substrate and having a driving circuit mounted on it; and
a touch panel mounted on the upper substrate, wherein on at least one side of the upper substrate the touch panel extends beyond the upper substrate ending at a position in a plan view overlapped with the tape carrier package on the lower substrate.

9. The liquid crystal display according to claim 8, wherein the touch panel has a non-touch area at an edge and wherein the non-touch area extends further than at least one edge of the upper substrate.

10. The liquid crystal display according to claim 9, wherein the upper substrate has a non-display area at an edge.

11. The liquid crystal display according to claim 10, wherein the non-touch area extends further than at least one edge of the non-display area.

12. The liquid crystal display according to claim 10, wherein the non-touch area extends further than at least one edge of the non-display area.

13. The liquid crystal according to claim 8, wherein the tape carrier package is connected to a printed circuit board.

14. A liquid crystal display, comprising:
a lower substrate having a lower polarizing plate adhered thereto, the lower substrate having an alignment mark for adhering a tape carrier package to the lower substrate;
an upper substrate having an upper polarizing plate adhered thereto, wherein the lower and upper substrates includes a display area and a non-display area;
a black matrix formed at an outer edge of the upper substrate of the non-display area;
a tape carrier package connecting the lower substrate to a printed circuit board; and
a touch panel mounted on the upper polarizing plate and having a non-touch area where picture information cannot be controlled, wherein on at least one side of the upper substrate the touch panel extends beyond the upper substrate and the non-touch area does not overlap the display area of the lower and upper substrates such that the non-touch area of the touch panel ends at a position overlapped with the tape carrier package on the second substrate.

15. The liquid crystal display according to claim 14, wherein the non-touch area extends further than at least one edge of the upper substrate.

16. The liquid crystal display according to claim 15, wherein the non-touch area extends further than at least one edge of the non-display area.

17. A method of fabricating a liquid crystal display with a touch panel, comprising:
joining an upper substrate to a lower substrate of a liquid crystal panel, the lower substrate having an alignment mark;
adhering a tape carrier package using the alignment mark, on which a driving circuit is mounted; and
mounting a touch panel on the upper substrate after adhering the tape carrier package to the lower substrate, wherein at least one edge of the touch panel extends further than at least one edge of the upper substrate.

18. The method according to claim 17, wherein the touch panel has a non-touch area at an edge.

19. The method according to claim 18, wherein the non-touch area extends further than at least one edge of the upper substrate.

20. The method according to claim 18, wherein the upper substrate has a non-display area at an edge.

21. The method according to claim 20, wherein the non-touch area extends further than at least one edge of the non-display area.

22. The method according to claim 20, wherein the non-touch area extends further than at least one edge of the non-display area.

23. The method according to claim 17, wherein the tape carrier package is connected to a printed circuit board.

* * * * *